US008769124B2

(12) United States Patent
Winter et al.

(10) Patent No.: US 8,769,124 B2
(45) Date of Patent: Jul. 1, 2014

(54) METHOD FOR OPERATING A NETWORK AND A NETWORK

(75) Inventors: Rolf Winter, Heidelberg (DE); Hans-Joerg Kolbe, Darmstadt (DE)

(73) Assignee: NEC Europe Ltd., Heidelberg (DE)

( * ) Notice: Subject to any disclaimer, the term of this patent is extended or adjusted under 35 U.S.C. 154(b) by 174 days.

(21) Appl. No.: 13/498,947

(22) PCT Filed: Sep. 28, 2010

(86) PCT No.: PCT/EP2010/005902
§ 371 (c)(1),
(2), (4) Date: May 23, 2012

(87) PCT Pub. No.: WO2011/038880
PCT Pub. Date: Apr. 7, 2011

(65) Prior Publication Data
US 2012/0239819 A1    Sep. 20, 2012

(30) Foreign Application Priority Data
Sep. 29, 2009    (EP) .................................... 09012318

(51) Int. Cl.
*G06F 15/16*    (2006.01)
(52) U.S. Cl.
USPC ............ 709/228; 709/224; 709/225; 370/231
(58) Field of Classification Search
USPC .......... 709/200–203, 217–228, 229; 370/231, 370/251, 252, 351
See application file for complete search history.

(56) References Cited

U.S. PATENT DOCUMENTS

| | | | |
|---|---|---|---|
| 6,760,429 B1 * | 7/2004 | Hung et al. | 379/265.09 |
| 7,051,087 B1 | 5/2006 | Bahl et al. | |
| 7,430,187 B2 * | 9/2008 | Holt et al. | 370/329 |
| 7,716,346 B2 | 5/2010 | Suzuki et al. | |
| 7,898,950 B2 * | 3/2011 | Barkley et al. | 370/230.1 |
| 2003/0110283 A1 * | 6/2003 | Lee | 709/233 |
| 2003/0163565 A1 | 8/2003 | Jiang et al. | |
| 2008/0043644 A1 * | 2/2008 | Barkley et al. | 370/261 |
| 2009/0279477 A1 | 11/2009 | Ishii et al. | |

FOREIGN PATENT DOCUMENTS

| | | |
|---|---|---|
| EP | 1 921 881 | 5/2008 |
| WO | 2004071044 A1 | 8/2004 |
| WO | 2008/103103 | 8/2008 |
| WO | 2008135279 A1 | 11/2008 |
| WO | 2009021739 A1 | 2/2009 |

OTHER PUBLICATIONS

International Search Report dated Mar. 3, 2011, corresponding to PCT/EP2010/005902.

* cited by examiner

*Primary Examiner* — Moustafa M Meky
(74) *Attorney, Agent, or Firm* — Young & Thompson

(57) ABSTRACT

For allowing a high degree of resource consumption within a network a method for operating a network is claimed, wherein at least one end user device is connected to an access network, wherein the method is characterized in that the at least one end user device or an application on the end user device queries at least one network element of the access network and/or at least one network element attached to the access network about low layer parameters information for optimizing connection and/or protocol parameters after having received the queried low layer parameters information. Further, a network is claimed, preferably for carrying out the above mentioned method.

21 Claims, 3 Drawing Sheets

METHOD FOR OPERATING A NETWORK AND A NETWORK

The present invention relates to a method for operating a network, wherein at least one end user device is connected to an access network.

BACKGROUND OF THE INVENTION

1. Field of the Invention

Further, the present invention relates to a network, preferably for carrying out the above method, wherein at least one end user device is connected to an access network.

2. Description of the Related Art

Today's access networks such as broadband or xDSL (x Digital Subscriber Line) networks and the devices connected to them have very particular properties that can significantly influence the performance of the network or Internet access as seen by the applications running on end user devices such as laptops and PCs. An end user device or system today has only limited means to address this issue as the information that would help to tune network stack parameters accordingly is not available as they do not directly connect to the access network but typically a home gateway or modem would connect to the access network on the one side and to a home network—often wireless LAN (Local Area Network), 802.11—on the other side. A, to a certain degree, similar problem can be found in the access networks today, where the DSL modem negotiates a rate with the MSAN/DSLAM (Multi Service Access Node/Digital Subscriber Line Access Multiplexer). The BRAS (Broadband Remote Access Server) needs this lower layer information for QoS (Quality of Service) provisioning and accounting. A protocol has been devised to deal with this issue called ANCP (Access Node Control Protocol), see ANCP, http://tools.ietf.org/wg/ancp/. Other protocols in the access network space are far from fulfilling this role, such as TR-69, see http://www.broadband-forum.org/technical/download/TR-069Amendment2.pdfl, as they are used to operate and manage the home gateway, which is still (at least) one IP hop away from the end user device where the access network visibility is missing.

The problem described here is the problem of resource consumption of for example background applications such as P2P (Peer-to-Peer) and interactive applications such as VoIP (Voice over Internet Protocol), Web browsing, gaming and others. The problem specifically is that background traffic should always yield to interactive traffic, i.e. it should stop or slow down the resource consumption, i.e. sending traffic, once interactive applications need it. In the IETF (Internet Engineering Task Force), the Low Extra Delay Background Traffic (LEDBAT) working group is dealing with these issues, see IETF LEDBAT working group, http://www.ietf.org/html.charters/ledbat-charter.html. But the IETF approach is a so called end-to-end approach, which does not rely on information that the access network and the devices in it or attached to it can provide.

The congestion control algorithm proposed in S. Shalunov, "Low Extra Delay Background Transport (LEDBAT)", http://tools.ietf.org/html/draft-shalunov-ledbat-congestion in the LEDBAT context tries to minimize the extra delay that background applications such as P2P add to interactive applications such as VoIP. It does so by estimating the delay it introduces. This delay is usually due to the modem buffer in the home gateway these days. Additionally, the base technology of the access network is important. E.g. in case ATM (Asynchronous Transfer Mode) is used, also quite common today, the algorithm could be optimized to send segments that exactly fill the ATM cells. Assuming small upstream bandwidths (below approx. 500 kbps), this could help to lower the probability of unnecessary head of line blocking. These are all what we call lower layer information of the access network itself (e.g. technology used with bandwidth and cell sizes) and the devices in it or attached to it (e.g. buffer sizes).

It is to be noted that U.S. Pat. No. 7,051,087—System and method for automatic detection and configuration of network parameters—deals with a different issue then the present invention. This U.S. Pat. No. 7,051,087 deals with changing networks and their required re-parameterization, and it makes a claim about a home network and an enterprise network where one has a static IP and the other a dynamic one. The user needs to manually switch from one to the other.

In PONs (Passive Optical Network) upstream sender timeslots on the shared PON are assigned by quite sophisticated algorithms taking into account e.g., measurements on a frame level (layer 2), see Cauvin et al., Common Technical Specification of the G-PON System among Major Worldwide Access Carriers, IEEE ComMag October 2006, and references therein and Assi et al., "Toward Quality of Service Protection in Ethernet Passive Optical Networks: Challenges and Solutions" in IEEE ComMag September/October 2007, and references therein. With this method, the access network can inform the endpoints that are unaware of the access network about its specific, current paramterization which can enable the IP endpoints to adapt their sending behavior exactly to the learned boundary conditions, e.g. send packet bursts that exactly fit into timeslots in order to prevent them from dynamically growing and shrinking.

BRIEF SUMMARY OF THE INVENTION

Thus, it is an object of the present invention to improve and further develop a method for operating a network and an according network in such a way, that a high degree of resource consumption within the network is possible.

In accordance with the invention, the aforementioned object is accomplished by a method according to claim 1. According to this claim 1 the method is characterized in that the at least one end user device or an application on said end user device queries at least one network element of the access network and/or at least one network element attached to the access network about low layer parameters information for optimizing connection and/or protocol parameters after having received the queried low layer parameters information.

Further, the aforementioned object is accomplished by a network according to claim 22. According to this claim 22 such a network is characterized in that the at least one end user device is comprising means or an application on said end user device for querying at least one network element of the access network and/or at least one network element attached to the access network about low layer parameters information for optimizing connection and/or protocol parameters after having received the queried low layer parameters information.

According to the invention it has been recognized that an accomplishment of the above mentioned object is possible by means of a query procedure originating from at least one end user device or from an application on the end user device in a very simple way. Concretely, the at least one end user device or an application on the end user device queries at least one network element of the access network and/or at least one network element attached to the access network about low layer parameters information, wherein the low layer parameters being preferably parameters of low layers with regard to the OSI (Open Systems Interconnection) model. After having received the queried low layer parameters information the end user device or the application can optimize connection and/or protocol parameters.

Thus, a high degree of resource consumption within the network is possible by a simple query procedure from an end user device.

Within a concrete embodiment the low layer parameters information could refer to the queried network element or elements. Thus, the end user device or the application can obtain low layer parameter information directly about the queried network element or elements.

Alternatively or additionally the low layer parameters information could refer to at least one other network element. Thus, the querying end user device or the application can obtain information with regard to at least one other network element and not with regard to the queried network element or elements.

Within a further concrete embodiment the end user device or the application could receive the queried low layer parameters information by the queried network element or elements and/or by another network element. Thus, within the most simple embodiment an end user device or an application on said end user device could obtain the requested information directly about and by the queried network element.

Within a further preferred embodiment a definable network element or an application on said network element could query at least one other network element of the access network and/or at least one other network element attached to the access network about low layer parameters information. In this case, the definable network element or an application on said network element could gather low layer parameters information from another network element for providing this information to an end user device or to an application on said end user device. Preferably, upon query by the end user device or the application on said end user device the definable network element or the application on said network element could transmit the queried low layer parameters information to the end user device or the application on said end user device. Thus, the proposed method could also allow to chain requests.

Preferably, the network element or the application on said network element could adapt the received information according to other collected data and/or other configuration available. This means, that the network element or the application on said network element could calculate a "tradeoff" out of different information gathered from segments in the network along a respective communication path.

With regard to a very reliable and simple query/response procedure the end user device or the querying network element and the queried network element could each have a communication manager that implements the query and response mechanism, respectively. By such a module or functionality a reliable performance of the proposed method is ensured.

Within a further preferred embodiment the communication manager at the queried network element could combine low layer parameters information with subscriber data and/or parameters. Such subscriber data and/or parameters could preferably be based on definable policies. Thus, a very sophisticated and individual method can be provided.

Within another preferred embodiment, a communication manager in a queried network element could combine information gathered or received from other network elements in the network path to calculate an aggregated tradeoff that is communicated back towards the entity that queried the network element.

Preferably, the queried network element could include a protection function for avoiding an overloading of the network element, e.g. in the case of an attack. Further, for security reasons appropriate means such as digital signatures could be employed. The exact means could depend on the operator policies and the network attachment procedure used.

Further, for providing a very reliable method for operating a network the communication manager at the end user device or at the querying network element could store the received low layer parameters information into a preferably local storage. Thus, the stored information can be used by the end user device as long as the information is stored within the storage.

Within a further preferred embodiment, the communication managers could provide an update function with regard to changing low layer parameters. Thus, in case parameters change the communication managers could exchange the new information in form of an update. Depending on the individual situation or network the update function could be push-based, i.e. initiated by the queried network element, or pull-based, i.e. initiated by the end user device or the querying network element.

With regard to a very reliable performance of the network the queried network element could comprise a compliance detector. Such a compliance detector could monitor whether the low layer information is used correctly by the end user device. Within a further preferred and very comfortable method the compliance detector could trigger the communication manager to inform the end user device, if the low layer parameters information is not used correctly or not in a definable way.

Further preferred, the end user device could comprise an adaptation module for optimizing the connection and/or protocol parameters and/or for providing the low layer parameters information to at least one definable application or protocol, so that an application or higher layer protocol can adapt or adapts its behaviour according to this information. In other words, such an adaptation module could use the received information to configure a network stack, or alternatively it could be queried by e.g. applications and protocols for them to use that information.

Within a further preferred embodiment the end user device could define or select the type of low layer parameters information which should be provided to the end user device. Thus, only the defined or selected type of low layer parameters information could be transmitted to the end user device.

Within a concrete embodiment the low layer parameters information could comprise an available bandwidth in upstream and/or downstream direction and/or a buffer size and/or a preferably maximum frame size and/or an indication whether the frame size is static or not. Other low layer parameters information could also be provided upon request by the end user device.

The optimizing of connection and/or protocol parameters could comprise selecting or parameterizing a protocol or an IP stack of the querying end user device. However, optimizing of other connection and/or protocol parameters is possible.

Within a concrete embodiment the network element could be a home gateway, a MSAN (Multi Service Access Node) or a DSLAM (Digital Subscriber Line Access Multiplexer). Further, the access network could be an xDSL (x Digital Subscriber Line) network, an xPON (x Passive Optical Network), a WiFi network, a WiMAX (Worldwide Interoperability for Microwave Access) network or an LTE (Long Term Evolution) network or further developments of such networks or wireless networks. However, also other network types could be access networks in the sense of the proposed method.

While end user devices conventionally make control decisions based on the end-to-end view that they have on the network, such as TCP's (Transmission Control Protocol) congestion control mechanism, many upcoming applications and transport services will greatly benefit from knowledge about lower layer parameters of the access network (such as the provisioned bandwidth) and certain information about the parameters of devices that reside in or are attached to the access network (such as queue lengths). Up to now, typically, these parameters are not available to end devices as they no longer connect directly to the access network (e.g. broadband, DSL but also wireless access networks such as WiMAX) but typically today a home gateway is connected directly and the end user devices are connected to a local area network, e.g. based on 802.11. However, the nature of both, devices and network, can have a significant impact on the performance characteristics of the network or Internet access of the end user devices. If the end systems have this information available, they can actively impact these characteristics by parameterizing their local IP stack and protocols accordingly, for example.

The present invention describes a method and a network, by which end user devices or end hosts or applications on said end user devices or on said end hosts learn the above mentioned parameters and shows how end user devices would use this information in order to tune network stack parameters to improve the network efficiency paying attribute to the changing network and application requirements.

The present invention is providing a request/response mechanism to query lower layer information of an access network and a request/response mechanism that queries network element information of network elements inside the access network or network elements that are attached to it. Further, a method to build request/response change and a mechanism to deal with changing access network and network element information are provided. Further, a module that configures the IP protocol stack to accommodate lower layer information and/or a module to ensure compliance of the end host or end user device parameterization are provided. Finally, a mechanism to discover the response module is shown.

Knowing these parameters can help to optimize higher layer stack parameters—in e.g. congestion control—or could even determine the choice of the protocol, e.g. knowing that the modem buffers are sufficiently small, regular TCP instead of a new background transport protocol can be used.

The present invention is not limited to xDSL deployments. Any other access/transport technology, e.g., x-PON, WiMAX, WiFi, and especially combinations of them like e.g., GPON-fed WiMAX benefit from this approach.

In other words, the invention is providing embodiments comprising:
1) a method/device to convey information of the access network characteristics and the devices therein to an IP endpoint or end user device (which is likely to be located in an untrusted domain) that is not directly attached to the access network with regard to the lower layers such as layer 1 and layer 2 in order to optimize the IP stack parameterization for these characteristics;
2) an apparatus to adapt network protocol stacks in such end user devices to the parameters learned from the access network;
3) a method to update changed lower layer parameters dynamically and make updates on related events in the access network;
4) a means to control the information sent and enrich it with parameters provided by the network operator based in specific policies imposed;
5) a method to chain requests using the method described above;
6) means to detect compliant behavior of IP endpoints or end user devices (e.g. by a module in access node or queried network element).

There are several ways how to design and further develop the teaching of the present invention in an advantageous way. To this end it is to be referred to the following explanation of preferred embodiments of the invention by way of example, illustrated by the figures on the other hand. In connection with the explanation of the preferred embodiments of the invention by the aid of the figures, generally preferred embodiments and further developments of the teaching will be explained.

DETAILED DESCRIPTION OF THE PREFERRED EMBODIMENTS

Figure 1:
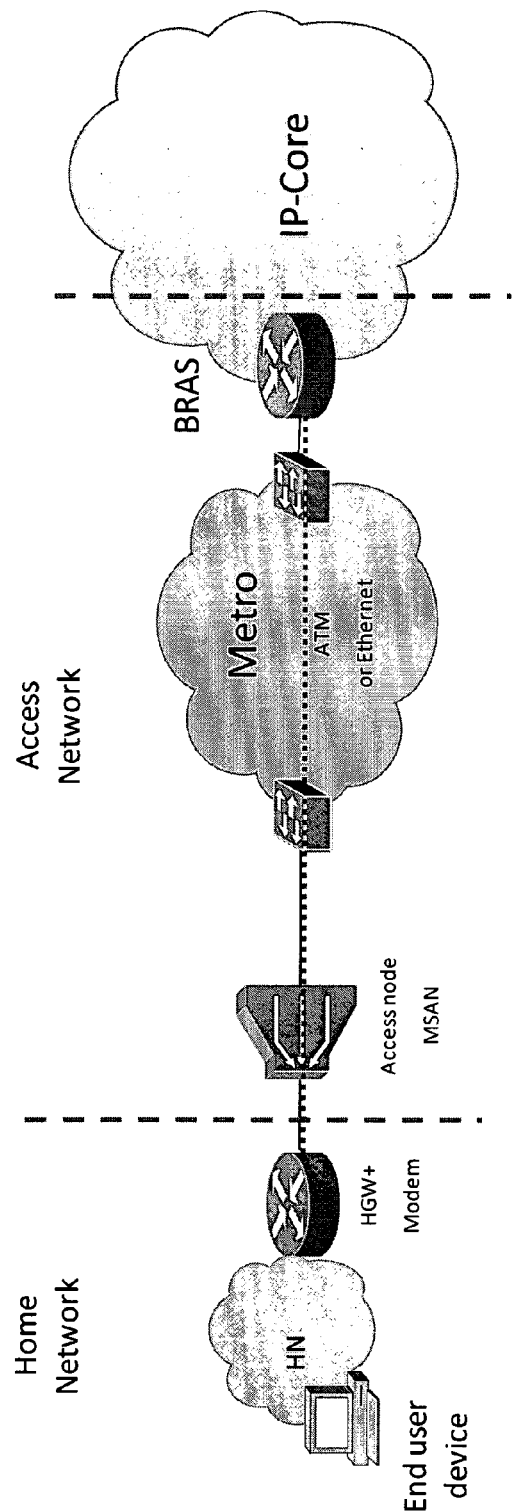
FIG. 1 is showing schematically a typical access network scenario in the form of a DSL setup.

In the remainder of this document we use the example of a DSL access network, see FIG. 1, a home gateway and a popular application, a P2P application, to illustrate the general problem. The access network consists of a BRAS, an MSAN/access node and the home gateway attached to it. For the purpose of this document, we only illustrate a single end system attached to the gateway without loss of generality.

To solve the problem as described above it is defined a method so that an end user device can query network elements in the form of for example nodes in the access network or attached to the access network about lower layer parameters in order to select or parameterize its protocols. The method comprises an end user device that queries network elements that are part of or attached to the access network, such as the home gateway or the MSAN. Upon receipt of a query, the network element answers with lower layer device configurations such as the negotiated bandwidth available—in both upstream and downstream direction—, buffer sizes or (maximum) frame sizes and an indication whether the frame size is static, e.g. ATM, or not, e.g. Ethernet. The end system can also specify whether it is only interested in certain information.

Although the example given here is related to xDSL at rather low speeds, using ATM, the scope of this invention—offering IP endpoints that are indirectly attached to an access network parameters about it—has a much wider scope and is applicable also to access networks such as WiMax or Passive Optical Networks.

Figure 2:
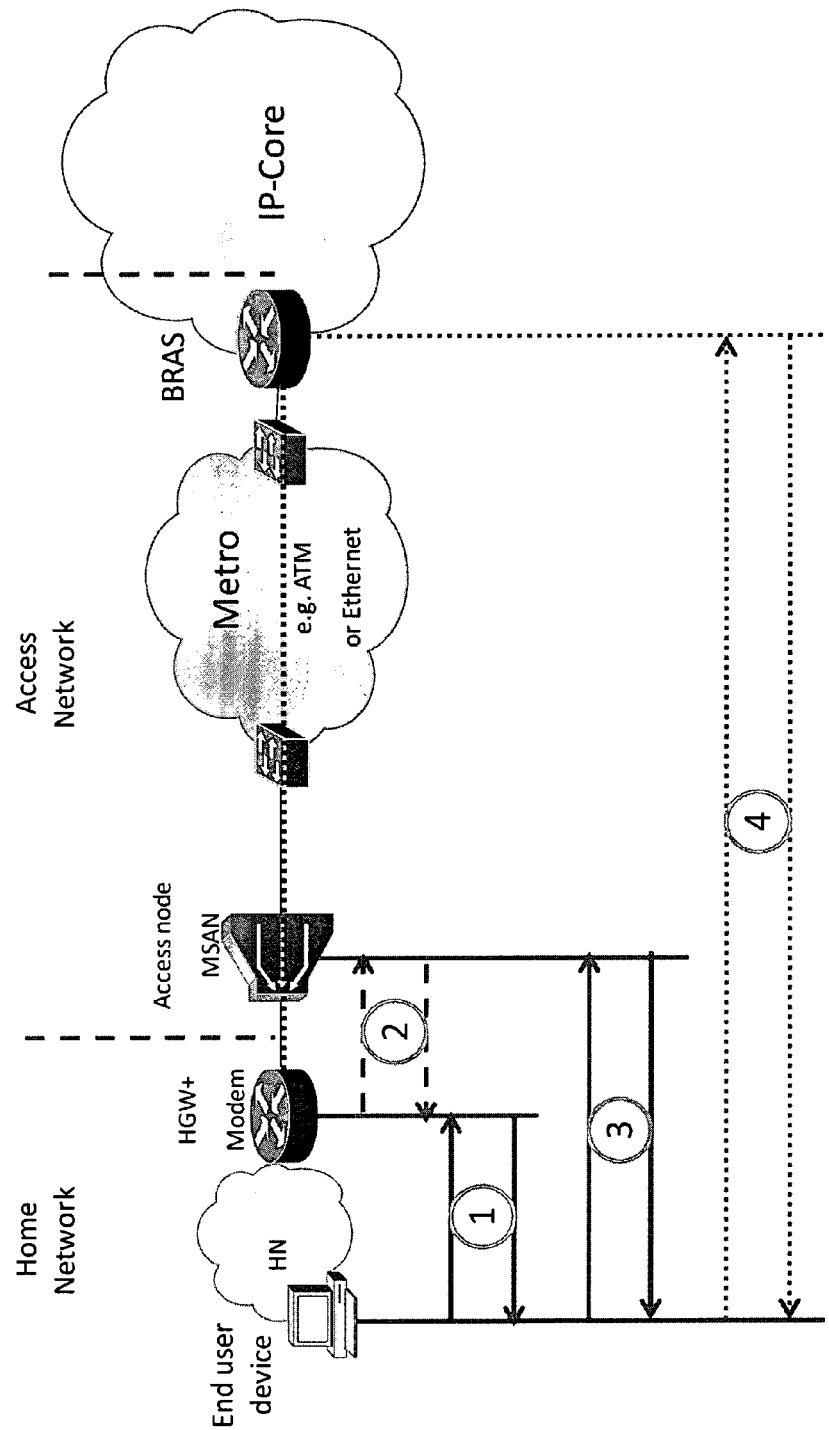
FIG. 2 is showing exemplary setups for the invention and
FIG. 3 is showing a network element view according to a preferred embodiment of the invention.

FIG. 2 depicts the network view of the invention. For the invention we are assuming a network attachment procedure that can be used to convey the IP address(es) of the node(s) that can be contacted, which could be one of the well established discovery mechanisms. In the home gateway case this might simply be the default gateway address but other means such as DHCP (Dynamic Host Configuration Protocol), PPP (Point-to-Point Protocol), a well defined anycast address etc. can be used. An end user device is querying one or all of these devices. In the picture above this could be case 1) where the home gateway is contacted or case 3) where the layer-3 MSAN receives the request or a combination of it. The proposed method also allows to chain requests as e.g. the home gateway might establish a PPP session to the operator, which includes the IP address of the node to request lower layer parameters from. The home gateway requests these parameters and stores them locally according to (2) in the figure. Once the end host queries for parameters, the home gateway can answer with all parameters known to it, including the ones gathered in step 2).

Figure 3:
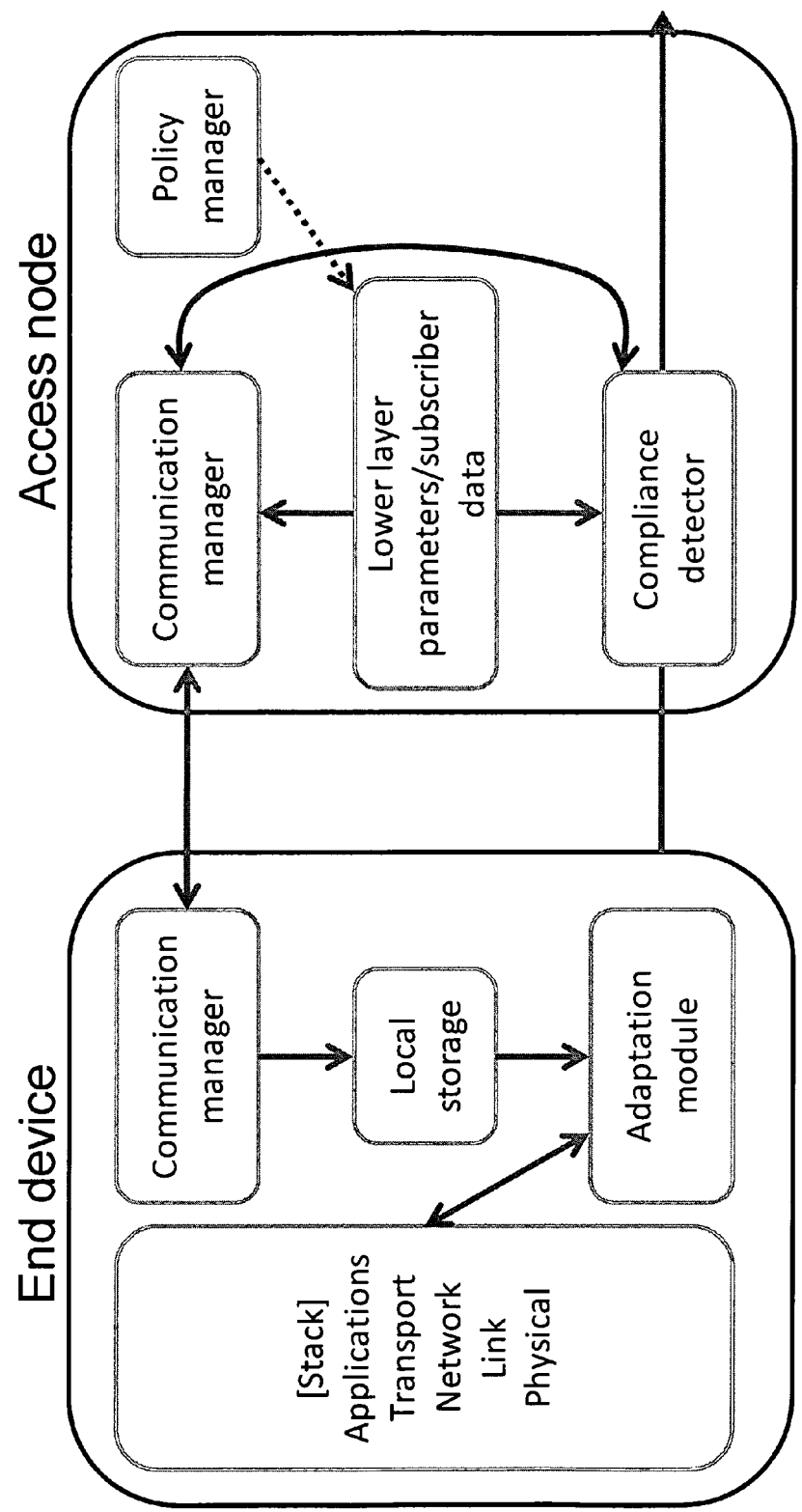

FIG. 3 illustrates the network element view of the proposed method and the required modules. Both the end device and the access node (network element) that is queried contain a communication manager that implements the request/response mechanism. On the access node side, the communication manager gathers lower layer information from the system and/or local storage and might also combine this data with subscriber data provided by the policy manager, e.g. if a possible rate is not permissible by a contract or user specific configurations apply. For the access node, it is important to include a protection function to not overload the node in the case of e.g. an attack. For security reasons appropriate means such as digital signatures might be employed. The exact means depends on the operator policies and the network attachment procedure used. On the end device side, the communication manager stores the data from the reply into a local storage. The communication managers also implement an update function, i.e. in case parameters change the communication managers exchange the new information in form of an update. This mechanism can be either push-based, initiated by the access node, or pull based, initiated by the end device.

An adaptation module on the end device uses this information to configure the network stack, or alternatively it can be queried by e.g. applications and protocols for them to use that information. Finally, the access node can implement a compliance detector, i.e. it can if possible implement a function to see whether the lower layer information is used correctly. In case the compliance detector observes that this is not the case it can trigger the communication manager to inform the end device accordingly.

The invention is providing a deterministic method, not relying on inaccurate measurements and wild guesses, to parameterize protocols and give information to advanced applications and layer-7 protocols. Further, an easy technical solution is provided to improve the efficiency of the access network as seen by the costumer. The solution can include information not only based on network parameters but also implicitly on policies by the operator, e.g. do not grant too many timeslots. The embodiments can be based on current network attachment procedures to implement discovery and security.

The embodiments can replace inaccurate indirect measurements of parameters that the network knows. Operators' customers user experience can be enhanced by better utilization of the available resources and better response times, for example. Further, a very good QoS can be provided in comparison with known methods. Users can even implement their QoS treatment of applications themselves. Further, an indirect endpoint traffic source control by operator policies is possible.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for operating a network, wherein at least one end user device is connected to an access network, said method comprising the steps of:
the at least one end user device or an application on said end user device makes a query querying at least one network element of the access network and/or at least one network element attached to the access network about low layer parameters information for optimizing connection and/or protocol parameters after having received the queried low layer parameters information, the at least one network element being a queried network element,
wherein a communication manager of the end user device or the querying network element implements the query,
wherein a communication manager of the queried network element has a communication manager that implements a response mechanism to the query, and
wherein optimizing connection and/or protocol parameters comprise selecting or parameterizing a protocol or an IP stack of the querying end user device; and
the end user device using the optimizing connection and/or protocol parameters sent from the queried network element to optimize connection parameters by selecting or parameterizing the protocol or the IP stack of the end user device.

2. A method according to claim 1, wherein the low layer parameters information refers to the queried network element or elements.

3. A method according to claim 1, wherein the low layer parameters information refers to at least one other network element.

4. A method according to claim 1, wherein the end user device or the application receives the queried low layer parameters information by the queried network element or elements and/or by another network element.

5. A method according to claim 1, wherein a definable network element or an application on said network element queries at least one other network element of the access network and/or at least one other network element attached to the access network about low layer parameters information.

6. A method according to claim 5, wherein the definable network element or the application on said network element transmits the queried low layer parameters information to the end user device or to an application on said end user device upon query by the end user device or the application on said end user device.

7. A method according to claim 5, wherein the network element or the application on said network element adapts the received information according to other collected data and/or other configuration available.

8. A method according to claim 1, wherein the communication manager at the queried network element is combining low layer parameters information with subscriber data and/or parameters.

9. A method according to claim 1, wherein the queried network element includes a protection function for avoiding an overloading of the network element.

10. A method according to claim 1, wherein the communication managers provide an update function with regard to changing low layer parameters.

11. A method according to claim 10, wherein the update function is i) push-based initiated by the queried network element or ii) pull-based initiated by the end user device or the querying network element.

12. A method according to claim 1, wherein the queried network element comprises a compliance detector.

13. A method according to claim 12, wherein the compliance detector triggers the communication manager to inform the end user device, if the low layer parameters information is not used correctly or not in a definable way.

14. A method according to claim 1, wherein the end user device comprises an adaptation module for optimizing the connection and/or protocol parameters and/or for providing the low layer parameters information to at least one definable application or protocol, so that an application or higher layer protocol can adapt or adapts its behaviour according to this information.

15. A method according to claim 1, wherein the end user device is defining or selecting the type of low layer parameters information.

16. A method according to claim 1, wherein the low layer parameters information comprises an available bandwidth in upstream and/or downstream direction and/or a buffer size and/or a preferably maximum frame size and/or an indication whether the frame size is static or not.

17. A method according to claim 1, wherein the network element is a home gateway, or a MSAN (Multi Service Access Node) or a DSLAM (Digital Subscriber Line Access Multiplexer).

18. A method according to claim 1, wherein the access network is an xDSL (x Digital Subscriber Line) network, an xPON (x Passive Optical Network), a WiFi network, a WiMAX (Worldwide Interoperability for Microwave Access) network or an LTE (Long Term Evolution) network.

19. A network, preferably for carrying out the method according to claim 1, wherein at least one end user device is connected to an access network, the at least one end user device comprises means or an application on said end user device for querying at least one network element of the access network and/or at least one network element attached to the access network about low layer parameters information for optimizing connection and/or protocol parameters after having received the queried low layer parameters information.

20. A method according to claim 1, wherein the communication manager at the queried network element is combining low layer parameters information with subscriber data and/or parameters, based on definable policies.

21. A method for operating a network, wherein an end user device is connected to an access network, said method comprising the steps of:
- a first communication manager of the end user device implementing a query to an access node of the access network, the query being for low layer parameter information for optimizing connection parameters of the end user device;
- upon receiving the query from the end user device, a second communication manager of the access node implementing a response to the end user device by the second communication manager gathering the low layer parameter information and providing an answer with the gathered low layer device parameter information including, in both upstream and downstream directions, frame size and an indication whether the frame size is static; and
- the end user device using the low layer device parameter information, in the answer sent from the access node, to optimize the connection parameters of the end user device including parameterizing an IP stack of the end user device.

* * * * *